US012763444B2

(12) United States Patent
Sugimoto et al.

(10) Patent No.: US 12,763,444 B2
(45) Date of Patent: Oct. 13, 2026

(54) METHOD FOR MANUFACTURING BIPOLAR POWER STORAGE DEVICE

(71) Applicant: KABUSHIKI KAISHA TOYOTA JIDOSHOKKI, Kariya (JP)

(72) Inventors: Yuki Sugimoto, Kariya (JP); Atsushi Minagata, Kariya (JP); Kazuo Katayama, Kariya (JP); Hiroki Yoshikawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 496 days.

(21) Appl. No.: 18/567,268

(22) PCT Filed: Feb. 4, 2022

(86) PCT No.: PCT/JP2022/004552
§ 371 (c)(1),
(2) Date: Dec. 5, 2023

(87) PCT Pub. No.: WO2022/259609
PCT Pub. Date: Dec. 15, 2022

(65) Prior Publication Data

US 2024/0275002 A1 Aug. 15, 2024

(30) Foreign Application Priority Data

Jun. 9, 2021 (JP) ................................ 2021-096649

(51) Int. Cl.
*H01M 50/618* (2021.01)
*H01M 10/04* (2006.01)
*H01M 50/627* (2021.01)

(52) U.S. Cl.
CPC ......... *H01M 50/618* (2021.01); *H01M 10/04* (2013.01); *H01M 50/627* (2021.01)

(58) Field of Classification Search
CPC ... H01M 50/618; H01M 50/627; H01M 10/04
See application file for complete search history.

(56) References Cited

U.S. PATENT DOCUMENTS

2016/0197373 A1* 7/2016 Shaffer, II ........... H01M 50/463 429/210

FOREIGN PATENT DOCUMENTS

JP 2013191450 A * 9/2013

OTHER PUBLICATIONS

International Search Report for PCT/JP2022/004552 dated Apr. 19, 2022.

* cited by examiner

*Primary Examiner* — Matthew T Martin
*Assistant Examiner* — Bartholomew A Hornsby
(74) *Attorney, Agent, or Firm* — Sughrue Mion, PLLC

(57) ABSTRACT

A method for manufacturing a bipolar power storage device includes a first depressurizing process in which an internal space is depressurized to a first pressure through an attachment, a first liquid injecting process in which a predetermined amount of electrolyte solution is injected into the internal space from a holding member through an liquid injection port by increasing the pressure in the holding member, a second depressurizing process in which a part of the electrolyte solution flows back from the internal space to the holding member by depressurizing the internal space to a second pressure, and a second liquid injecting process in which the electrolyte solution is injected into the internal space by increasing the pressure in the holding member. The second depressurizing process includes an initial depressurizing process in which the internal space is depressurized at a depressurizing speed lower than a depressurizing speed in the first depressurizing process.

14 Claims, 8 Drawing Sheets

METHOD FOR MANUFACTURING BIPOLAR POWER STORAGE DEVICE

CROSS REFERENCE TO RELATED APPLICATIONS

This application is a National Stage of International Application No. PCT/JP2022/004552 filed Feb. 4, 2022, claiming priority based on Japanese Patent Application No. 2021-096649 filed Jun. 9, 2021, the contents of all of which are incorporated herein by reference in their entirety.

TECHNICAL FIELD

The present disclosure relates to a method for manufacturing a bipolar power storage device.

BACKGROUND ART

As a conventional method for manufacturing a bipolar power storage device, a manufacturing method that includes a process of injecting an electrolyte solution into a space between electrodes that are arranged facing each other with a separator disposed between the electrodes has been known (see, for example, Patent Document 1). In the bipolar power storage device, if an active material layer and the separator are not sufficiently impregnated with the electrolyte solution, a resistance value increases, and battery performance deteriorates.

In the manufacturing method described in Patent Document 1, an electrolyte solution is injected into a battery case. Further, a group of electrodes is impregnated with the electrolyte solution by repeating pressurizing, depressurizing, and injecting the electrolyte solution in the battery case using a pump.

CITATION LIST

Patent Literature

[Patent Document 1] Japanese Patent Application Publication No. 2013-191450

SUMMARY OF THE INVENTION

Technical Problem

In a bipolar power storage device using bipolar electrodes, a space between metal plates of the electrodes forms an internal space of a cell. In the bipolar power storage device, since the internal space of the cell is narrower than that of a general prismatic cell, the internal pressure easily increases when gas is generated due to a charging and discharging reaction or the like. In order to suppress an increase of the internal pressure, the amount of electrolyte solution injected into the internal space of the cell needs to be reduced to provide an extra space to accommodate gas. On the other hand, if the amount of electrolyte solution injected into the internal space of the cell decreases, air may be trapped in the cell during the impregnation process, which may result in defective impregnation of the electrodes with electrolyte solution.

An object of the present disclosure is to provide a method for manufacturing a bipolar power storage device that can suppress defective impregnation of electrodes with an electrolyte solution.

Solution to Problem

In a method for manufacturing a bipolar power storage device according to one aspect of the present disclosure, the bipolar power storage device includes an electrode stack in which electrodes are stacked, the electrodes including a bipolar electrode that includes a current collector, a positive electrode active material layer on one surface of the current collector, and a negative electrode active material layer on the other surface of the current collector, a sealing body provided between the electrodes disposed adjacently, the sealing body and the electrodes disposed side by side defining an internal space in which an electrolyte solution is accommodated, a liquid injection port formed in the sealing body and providing communication between the internal space and an outside of the bipolar power storage device, and the method includes: a first depressurizing process in which the internal space is depressurized to a first pressure lower than an atmospheric pressure, through an attachment attached to the liquid injection port; a first liquid injecting process, after the first depressurizing process, in which a predetermined amount of the electrolyte solution is injected into the internal space depressurized in the first depressurizing process from a holding member through the liquid injection port, by increasing the pressure in the holding member holding the predetermined amount of the electrolyte solution to a pressure higher than the first pressure; a second depressurizing process, after the first liquid injecting process, in which a part of the electrolyte solution flows back from the internal space to the holding member through the holding member and the liquid injection port by depressurizing the internal space in which the predetermined amount of the electrolyte solution is injected to a second pressure lower than the atmospheric pressure; and a second liquid injecting process, after the second depressurizing process, in which the electrolyte solution is injected into the internal space through the liquid injection port from the holding member by increasing the pressure in the holding member holding the electrolyte solution having flowed back in the second depressurizing process to a pressure higher than the second pressure, in which the second depressurizing process includes an initial depressurizing process in which the internal space is depressurized at a depressurizing speed lower than a depressurizing speed in the first depressurizing process.

In the above-described method for manufacturing the bipolar power storage device, the electrolyte solution is injected by the first liquid injecting process after the internal space defined by the electrodes disposed side by side and the sealing body is depressurized by the first depressurizing process, so that the electrolyte solution may be easily injected into the internal space using a difference in pressure (differential pressure). In addition, in the second depressurizing process, the internal space is depressurized at a depressurizing speed lower than that in the first depressurizing process. In this way, since the second depressurizing process is performed by controlling the depressurizing speed, impregnation of the electrolyte solution into the electrodes is promoted, and defective impregnation of the electrolyte into the electrode is suppressed. Further, scattering of the electrolyte solution flowing back into the holding member can be suppressed.

In the initial depressurizing process, the internal space may be depressurized at a constant depressurizing speed. In this case, impregnation of the electrode with the electrolyte solution may be effectively promoted.

The second pressure may be higher than the first pressure. In this case, for example, by setting the second pressure to be equal to or higher than the saturated vapor pressure of the electrolyte solution, volatilization of the electrolyte solution may be suppressed.

The second pressure may be equal to or higher than the saturated vapor pressure of the electrolyte solution. In this case, volatilization of the electrolyte solution may be suppressed.

In the second liquid injecting process, oxygen gas may be injected from the holding member into the internal space by supplying oxygen gas into the holding member.

The method for manufacturing the bipolar power storage device may further include a repeating process in which the second depressurizing process and the second liquid injecting process are performed repeatedly. In this case, an active material layer and a separator may be more effectively impregnated with the electrolyte solution.

In the second liquid injecting process performed last, oxygen gas may be injected from the holding member into the internal space by supplying oxygen gas into the holding member.

The method for manufacturing the bipolar power storage device may further include a maintaining process in which the internal space is maintained at the second pressure after the second depressurizing process, and a time for which the internal space is maintained at the second pressure in the maintaining process may become longer depending on the number of times of performing the second depressurizing process. In this case, since the internal space is maintained in a depressurized state by the maintaining process, gas is easily discharged from unimpregnated portions of the active material layer and the separator. Although the unimpregnated portions decrease as the number of times of performing the second depressurizing process increases, the time for which the internal space is maintained in a depressurized state in the maintaining process increases depending on the number of times of performing the second depressurizing process, so that gas is more easily discharged from the unimpregnated portions.

The method for manufacturing the bipolar power storage device may further include a maintaining process in which the internal space is maintained at the second pressure after the second depressurizing process. In this case, since the internal space is maintained in a depressurized state by the maintaining process, gas is easily discharged from the unimpregnated portions of the active material layer and the separator.

At least one of the first depressurizing process and the second depressurizing process is performed to one of a pair of internal spaces disposed side by side in a stacking direction of the electrode stack in a state in which the other of the pair of internal spaces is not depressurized. In this case, a pressing force is applied to the one of the internal spaces from the other of the internal spaces due to the pressure difference, so that depressurizing may be performed easily.

The second depressurizing process may include an additional depressurizing process, after the initial depressurizing process, in which the internal space is depressurized at the depressurizing speed higher than that in the initial depressurizing process. In this case, as compared to the case where depressurizing is continued at the same depressurizing speed as in the initial depressurizing process, manufacturing time is shortened, whereby the productivity can be improved.

The method for manufacturing the bipolar power storage device may further include a placing process in which the holding member capable of holding the electrolyte solution is attached to the liquid injection port via the attachment. In this case, a series of processes such as depressurizing the internal space and injecting liquid can be performed through the attachment attached to the liquid injection port.

In the first liquid injecting process, the electrolyte solution may be injected into the internal space by increasing the pressure in the holding member higher than the atmospheric pressure. In this case, the injection is accelerated and the time for re-injection may be shortened.

In the second liquid injecting process, the electrolyte solution may be injected into the internal space by increasing the pressure in the holding member to a pressure higher than the atmospheric pressure. In this case, the re-injection is accelerated and the time for re-injection may be shortened.

Advantageous Effects of Invention

According to the present disclosure, a method for manufacturing a bipolar power storage device that can suppress defective impregnation of electrodes with an electrolyte solution may be provided.

DESCRIPTION OF EMBODIMENTS

Figure 1:
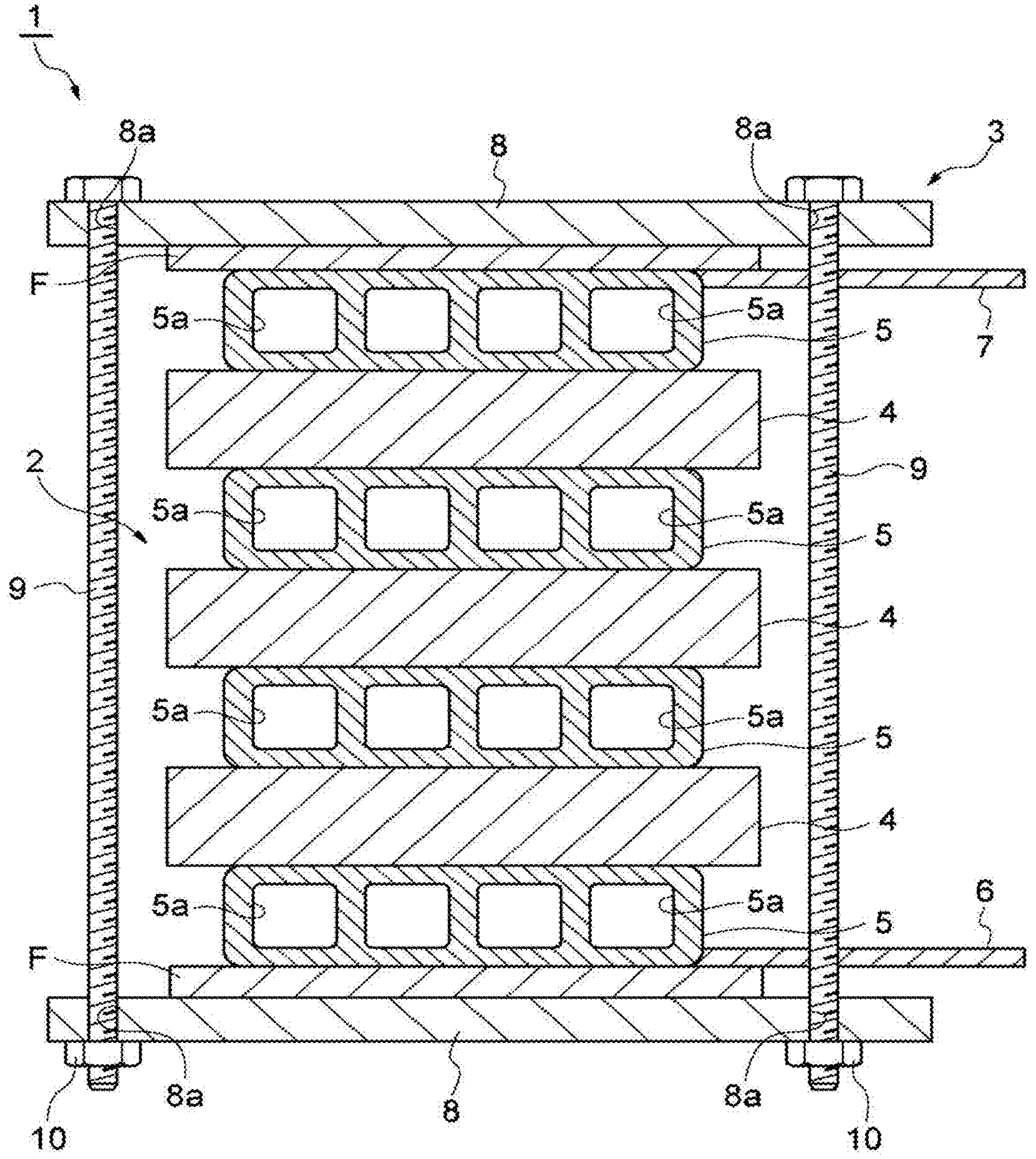
FIG. 1 is a schematic cross-sectional view illustrating a configuration of a bipolar power storage device according to an embodiment.

Hereinafter, an embodiment of the present disclosure will be described in detail with reference to the accompanying drawings. In the description of the drawings, the same reference numerals are used for the same or equivalent parts, and the repeated descriptions are omitted.

FIG. 1 is a schematic cross-sectional view illustrating a configuration of a bipolar power storage device according to an embodiment. A bipolar power storage device 1 (hereinafter simply referred to as a "power storage device 1") illustrated in FIG. 1 is a device used for a battery in various vehicles such as a forklift truck, a hybrid vehicle, and an electric vehicle. The power storage device 1 is a secondary battery such as a nickel-metal hydride secondary battery and a lithium-ion secondary battery. In the present embodiment, an example of a case where the power storage device 1 is a nickel-metal hydride secondary battery will be described. The power storage device 1 includes a module stack 2 and a constraining member 3 that applies a constraint load to the module stack 2 in a stacking direction of the module stack 2

The module stack 2 includes power storage modules 4 and conductive plates 5 stacked on the power storage modules 4. The module stack 2 includes a plurality of power storage modules 4 (three power storage modules in the present embodiment), and a plurality of conductive plates 5 (four conductive plates in the present embodiment). The power storage modules 4 each are a bipolar battery, and have a rectangular shape as viewed in the stacking direction.

The power storage modules 4 disposed side by side in the stacking direction are electrically connected through the conductive plates 5. The conductive plates 5 are arranged between the power storage modules 4 disposed side by side in the stacking direction, and the outside of the power storage modules 4 disposed on opposite ends in the stacking direction. A positive terminal 6 is connected to one of the conductive plates 5 disposed on the outside of the power storage modules 4 on the opposite ends in the stacking direction. A negative terminal 7 is connected to the other of the conductive plates 5 disposed on the outside of the power storage module 4 disposed on the opposite ends in the stacking direction. The positive terminal 6 and the negative terminal 7 are drawn out, for example, from edge portions of the conductive plates 5 in a direction perpendicularly to the stacking direction. Charging and discharging of the power storage device 1 are performed through the positive terminal 6 and the negative terminal 7.

A plurality of passages 5*a* through which a refrigerant such as air flows are formed inside the conductive plates 5. The flow passages 5*a* extend along a direction that crosses (perpendicularly) the stacking direction and a drawing direction in which the positive terminal 6 and the negative terminal 7 are drawn. The conductive plates 5 serve as a heat sink for dissipating heat generated in the power storage modules 4 by allowing a refrigerant to flow through these passages 5*a*, in addition to serving as a connecting member for electrically connecting the plurality of power storage modules 4 to each other. Although an area of each of the conductive plates 5 is smaller than that of each of the power storage modules 4 as viewed in the stacking direction in an example illustrated in FIG. 1, the area of the conductive plate 5 may be the same as that of the power storage module 4, or may be larger than that of the power storage module 4 in view of improving the heat dissipation performance.

The constraining member 3 includes a pair of end plates 8 between which the module stack 2 is sandwiched in the stacking direction, fastening bolts 9 and nuts 10 that fasten the end plates 8 to each other. The end plates 8 each are a rectangular metal plate having an area greater than the areas of the power storage module 4 and the conductive plate 5 as viewed in the stacking direction. A film F having an electrically insulating property is provided on a surface of each of the end plates 8 facing the module stack 2. The film F provides insulation between the end plate 8 and the conductive plate 5.

Insertion holes 8*a* are formed in edge portions of each of the end plates 8 at positions outside the module stack 2. The fastening bolts 9 inserted from the insertion holes 8*a* of one of the end plates 8 toward the insertion holes 8*a* of the other of the end plates 8, and the nuts 10 are screwed onto the tips of the fastening bolts 9 protruding from the insertion holes 8*a* of the other of the end plates 8. In this way, the power storage modules 4, the conductive plates 5 are held between the end plates 8, which forms a unit corresponding to the module stack 2, and constraint load is applied to the module stack 2 in the stacking direction.

Figure 2:
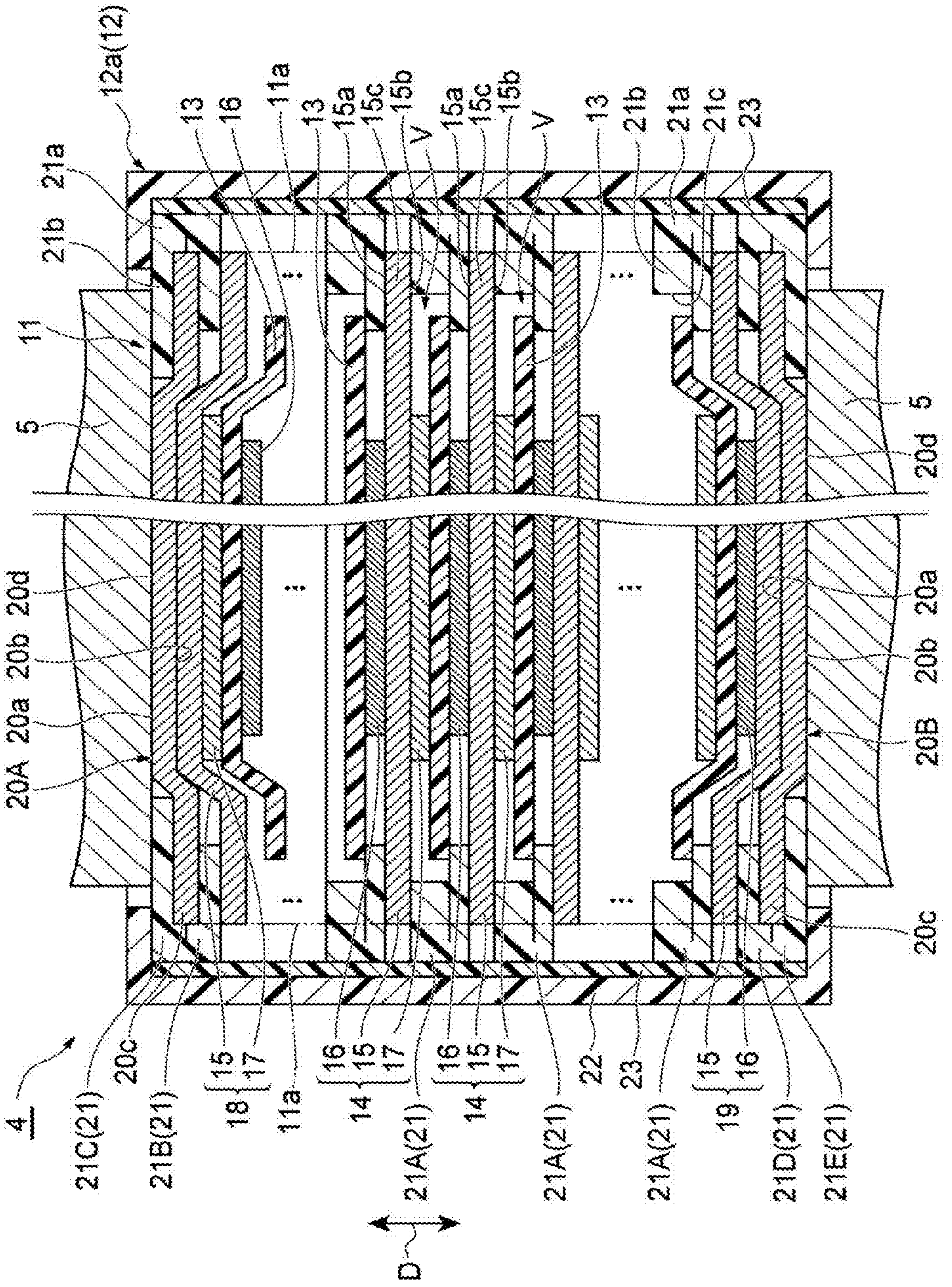
FIG. 2 is a schematic cross-sectional view illustrating an internal configuration of a power storage module illustrated in FIG. 1.

Next, the configuration of the power storage module 4 will be described in detail. FIG. 2 is a schematic cross-sectional view illustrating an internal configuration of the power storage module 4 illustrated in FIG. 1. As illustrated in FIG. 2, the power storage module 4 includes an electrode stack 11 and a sealing body 12 that is made of resin and seals the electrode stack 11. The power storage module 4 has, for example, a rectangular parallelepiped shape.

The electrode stack 11 includes a plurality of electrodes stacked with separators 13 disposed therebetween along the stacking direction D, and a current collector (metal plates 20A, 20B) located at staking ends of the electrode stack 11. The plurality of electrodes include a negative terminal electrode 18, a positive terminal electrode 19, and a plurality of bipolar electrodes 14 stacked between the negative terminal electrode 18 and the positive terminal electrode 19. A stack of the plurality of bipolar electrodes 14 is provided between the negative terminal electrode 18 and the positive terminal electrode 19.

Each of the bipolar electrodes 14 includes a current collector (metal plate 15) having one surface 15*a* and the other surface 15*b* on the opposite side from the one surface 15*a*, a positive electrode 16 provided on the one surface 15*a*, and a negative electrode 17 on provided on the other surface 15*b*. The one surface 15*a* faces one side in the stacking direction D. The one surface 15*a* faces, for example, upward in the gravity direction. The other surface 15*b* faces the other side in the stacking direction D. The other surface 15*b* faces, for example, downward in the gravity direction. The positive electrode 16 is a positive electrode active material layer formed by coating the metal plate 15 with a positive electrode active material. The negative electrode 17 is a negative electrode active material layer formed by coating the metal plate 15 with a negative electrode active material. In the electrode stack 11, the positive electrode 16 of one of the bipolar electrodes 14 faces the negative electrode 17 of another of the bipolar electrodes 14 disposed side by side with the one of the bipolar electrodes 14 on one side thereof in the stacking direction D with the separator 13 disposed therebetween. In the electrode stack 11, the negative electrode 17 of one of the bipolar electrodes 14 faces the positive electrode 16 of another of the bipolar electrodes 14 disposed side by side with the one of the bipolar electrodes 14 on the other side thereof in the stacking direction D with the separator 13 disposed therebetween.

The negative terminal electrode 18 includes the metal plate 15 and the negative electrode 17 provided on the other surface 15*b* of the metal plate 15. The negative terminal electrode 18 is disposed at one end of the electrode stack 11 in the stacking direction D so that the other surface 15*b* faces the center of the electrode stack 11 in the stacking direction D. A metal plate 20A is further stacked on the one surface 15*a* of the metal plate 15 of the negative terminal electrode 18, and the negative terminal electrode 18 is electrically connected to one of the conductive plates 5 disposed adjacently to the power storage module 4 through the metal plate 20A. The negative electrode 17 formed on the other surface 15*b* of the metal plate 15 of the negative terminal electrode 18 faces the positive electrode 16 of the bipolar electrode 14 disposed at the one end in the stacking direction D with the separator 13 disposed therebetween.

The positive terminal electrode 19 includes the metal plate 15 and the positive electrode 16 provided on the one surface 15*a* of the metal plate 15. The positive terminal electrode 19 is disposed at the other end of the electrode stack 11 in the stacking direction D so that the one surface 15*a* faces the center of the electrode stack 11 in the stacking direction D. A metal plate 20B is further stacked on the other surface 15*b* of the metal plate 15 of the positive terminal electrode 19, and the positive terminal electrode 19 is electrically connected to the other of the conductive plates 5 disposed adjacently to the power storage module 4 via the metal plate 20B. The positive electrode 16 formed on the one surface 15*a* of the metal plate 15 of the positive terminal electrode 19 faces the negative electrode 17 of the bipolar electrode 14 disposed at the other end in the stacking direction D with the separator 13 disposed therebetween.

The metal plate 15 is made of metal such as nickel or nickel-plated steel. As an example, the metal plate 15 is a rectangular metal foil made of nickel. Each of the metal plates 15 is one of the metal plates included in the electrode stack 11. The metal plate 15 has an edge portion 15*c* that has a rectangular frame shape, and the edge portion 15*c* is a part of an uncoated region 15*d* (see FIG. 3) where neither the positive electrode active material nor the negative electrode active material is applied. For example, nickel hydroxide is used as the positive electrode active material forming the positive electrode 16. For example, hydrogen storage alloy is used as the negative electrode active material forming the negative electrode 17. In the present embodiment, a region where the negative electrode 17 is formed on the other surface 15*b* of the metal plate 15 is greater than a region where the positive electrode 16 is formed on the one surface 15*a* of the metal plate 15. The electrode stack 11 includes a plurality of metal plates 15, 20A, 20B which are stacked.

The separator 13 is a member for preventing short circuit between the metal plates 15, and has, for example, a sheet shape. For example, a porous film made of a polyolefin-based resin such as polyethylene (PE) or polypropylene (PP), a woven fabric or a nonwoven fabric made of polypropylene, methylcellulose, or the like, and the like may be used for the separator 13. The separator 13 may be reinforced with a vinylidene fluoride resin compound. It is noted that the separator 13 is not limited to a sheet shape, but may be a bag shape.

The metal plates 20A, 20B are substantially the same members as the metal plates 15, and are made of metal such as nickel or nickel-plated steel. Each of the metal plates 20A, 20B is one of the metal plates included in the electrode stack 11. As an example, the metal plate 20A, 20B each are a rectangular metal foil made of nickel. The metal plates 20A, 20B are uncoated electrodes in which neither the positive electrode active material layer nor the negative electrode active material layer is coated on the one surface 20*a* and the other surface 20*b*. That is, the metal plates 20A, 20B are uncoated electrodes in which active material layers are not provided on either surface.

The metal plate 20A is positioned at the one end of the electrode stack 11. With the metal plate 20A, the negative terminal electrode 18 is placed between the metal plate 20A and the bipolar electrode 14 along the stacking direction D. The other surface 20*b* of the metal plate 20A and the one surface 15*a* of the metal plate 15 of the negative terminal electrode 18 are in direct contact with each other without any part disposed therebetween. Thus, the metal plate 20A and the negative terminal electrode 18 are electrically connected. The metal plate 20B is positioned at the other end of the electrode stack 11. With the metal plate 20B, the positive terminal electrode 19 is placed between the metal plate 20B and the bipolar electrode 14 along the stacking direction D. The one surface 20*a* of the metal plate 20B and the other surface 15*b* of the metal plate 15 of the positive terminal electrode 19 are in direct contact with each other without any part disposed therebetween. Thus, the metal plate 20B and the positive terminal electrode 19 are electrically connected.

In the electrode stack 11, a central region of the electrode stack 11 (the region where the active material layers are positioned in the bipolar electrode 14, the negative terminal electrode 18, and the positive terminal electrode 19) is swelled in the stacking direction D as compared to a region surrounding the central region. Therefore, the metal plates 20A, 20B are bent in a direction in which the central regions of the metal plates 20A, 20B are separated from each other. The central regions of the one surface 20*a* of the metal plate 20A and the other surface 20*b* of the metal plate 20B are abut on (are in contact with) the conductive plates 5, respectively. That is, the conductive plates 5 are placed in contact with the metal plates 20A, 20B, respectively, at the ends of the electrode stack 11.

The sealing body 12 has a rectangular tubular shape as a whole, and made of, for example, an insulating resin. The sealing body 12 is formed, for example, into a rectangular tubular shape having a pair of short-side portions 12*a* and a pair of long-side portions 12*b* (see FIG. 3). The sealing body 12 is provided so as to surround a side surface 11*a* of the electrode stack 11. The sealing body 12 holds the edge portions 15*c* on the side surface 11*a*.

The sealing body 12 includes a plurality of first sealing portions 21 (resin portions) having a frame shape and disposed on edge portions of the metal plates (i.e., the edge portions 15*c* of the metal plates 15 and edge portions 20*c* of the metal plates 20A, 20B) included in the electrode stack 11, and a second sealing portion 22 surrounding the first sealing portions 21 from the outside along the side surface 11*a* and connected to each of the first sealing portions 21. The first sealing portions 21 and the second sealing portions 22 are made of, for example, insulating resin having alkali resistance. As a material of the first sealing portions 21 and the second sealing portions 22, for example, polypropylene (PP), polyphenylene sulfide (PPS), modified polyphenylene ether (modified PPE), and the like, may be used.

The first sealing portions 21 are provided continuously over the entire circumference of the edge portions 15*c* of the metal plates 15 and the edge portions 20*c* of the metal plates 20A, 20B, and have a rectangular frame shape as viewed in the stacking direction D. The first sealing portions 21 are welded to the edge portions 15*c* of the metal plates 15 and the edges 20*c* of the metal plates 20A, 20B, respectively, by, for example, ultrasonic welding or hot plate welding. Thus, the first sealing portions 21 and the metal plates 15, and the first sealing portions 21 and the metal plates 20A, 20B are air-tightly joined to one another. The first sealing portions 21 extend to the outside of the edge portions 15*c* of the metal plates 15 or the edge portions 20*c* of the metal plates 20A, 20B as viewed in the stacking direction D. The first sealing portions 21 each include an outer portion 21*a* that protrudes outward from edges of the metal plates 15 or the metal plates 20A, 20B, and an inner portion 21*b* positioned inward from the edges of the metal plates 15 or the metal plates 20A, 20B. A welding layer 23 is formed at the tip portions (outer edge portion) of the outer portions 21*a* of the first sealing portions 21. The welding layer 23 is formed by joining the tip portions of the first sealing portions 21 that have been melted by hot plate welding, for example.

The plurality of first sealing portions 21 include a plurality of first sealing portions 21A provided on the bipolar electrodes 14 and the positive terminal electrode 19, a first sealing portion 21B provided on the negative terminal electrode 18, a first sealing portion 21C provided on the metal plate 20A, and first sealing portions 21D, 21E provided on the metal plate 20B.

The first sealing portions 21A are joined to the one surfaces 15*a* of the metal plates 15 of the bipolar electrodes 14 and the positive terminal electrode 19. The inner portions 21*b* of the first sealing portions 21A are positioned between the edge portions 15*c* of the metal plates 15 disposed side by side in the stacking direction D. As viewed in the stacking direction D, regions where the edge portions 15*c* of the one surfaces 15*a* of the metal plates 15 and the first sealing portions 21A are overlapped with each other correspond to joining regions where the metal plates 15 and the first sealing portions 21A are joined.

In the present embodiment, the first sealing portions 21A each have a two-layer structure formed by folding one film in half. The outer edge portions of the first sealing portions 21A embedded in the second sealing portion 22 each are a folded portion (a bent portion) of the film. The first layers of the films forming the first sealing portions 21A are connected to the one surfaces 15*a*, respectively. The inner edges of the second layers of the films each are positioned outward with respect to the inner edges of the first layers of the films as viewed in the stacking direction D, and form a stepped portion on which the separator 13 is placed. The inner edges of the second layers of the films each are positioned inward with respect to the edges of the metal plates 15 as viewed in the stacking direction D.

The first sealing portion 21B is connected to the one surface 15*a* of the metal plate 15 of the negative terminal electrode 18. The inner portion 21*b* of the first sealing portion 21B is positioned between the edge portion 15*c* of the metal plate 15 of the negative terminal electrode 18 and the edge portion 20*c* of the metal plate 20A disposed side by side in the stacking direction D. As viewed in the stacking direction D, a region where the edge portion 15*c* of the one surface 15*a* of the metal plate 15 and the inner portion 15*b* of the first sealing portions 21B are overlapped with each other corresponds to a joining region where the metal plate 15 and the first sealing portion 21B are joined. The first sealing portion 21B is also joined to the other surface 20*b* of the metal plate 20A. As viewed in the stacking direction D, a region where the edge portion 20*c* of the other surface 20*b* of the metal plate 20A and the first sealing portion 21B are overlapped with each other corresponds to the joining region where the metal plate 20A and the first sealing portion 21B are joined. In the present embodiment, the first sealing portion 21B is also joined to the edge portion 20*c* of the other surface 20*b* of the metal plate 20A. It can be said that the first sealing portion 21B is provided not only on the negative terminal electrode 18 but also on the metal plate 20A.

The first sealing portion 21C is connected to the one surface 20*a* (outer surface) of the metal plate 20A. In the present embodiment, the first sealing portion 21C is positioned closest to the one end, among the plurality of first sealing portions 21, in the stacking direction D. As viewed in the stacking direction D, a region where the edge portion 20*c* of the one surface 20*a* of the metal plate 20A and the first sealing portion 21C are overlapped with each other corresponds to a joining region where the metal plate 20A and the first sealing portion 21C are joined. The one surface 20*a* of the metal plate 20A has an exposed surface 20*d* exposed from the first sealing portion 21C. The conductive plate 5 is placed abutting on (in contact with) in contact with the exposed surface 20*d*.

In the present embodiment, the outer edge portions of the first sealing portions 21B, 21C embedded in the second sealing portion 22 are continuous to each other. That is, the first sealing portions 21B, 21C are formed by folding one film in half with the edge portion 20*c* of the metal plate 20A interposed therebetween. The outer edge portions of the first sealing portions 21B, 21C are the folded portion (bent portion) of the film. The film forming the first sealing portions 21B, 21C is joined to the edge portion 20*c* on both the one surface 20*a* and the other surface 20*b* of the metal plate 20A. In this way, by connecting the opposite surfaces of the metal plate 20A to the first sealing portions 21B, 21C, seepage of the electrolyte solution due to the so-called alkali creep phenomenon may be suppressed.

The first sealing portion 21D is joined to the one surface 20*a* of the metal plate 20B. The inner portion 21*b* of the first sealing portion 21D is positioned between the edge portion 15*c* of the metal plate 15 of the positive terminal electrode 19 and the edge portion 20*c* of the metal plate 20B disposed side by side in the stacking direction D. As viewed in the stacking direction D, a region where the edge portion 20*c* of the one surface 20*a* of the metal plate 20B and the first sealing portion 21D are overlapped with each other corresponds to a connecting region where the metal plate 20B and the first sealing portion 21D are joined.

The first sealing portion 21E is disposed on the edge portion 20*c* of the other surface 20*b* (outer surface) of the metal plate 20B. In the present embodiment, the first sealing portion 21E is positioned closest to the other end in the stacking direction D among the plurality of first sealing portions 21. In the present embodiment, the first sealing portion 21E is not joined to the metal plate 20B. The other surface 20*b* of the metal plate 20B has an exposed surface 20*d* exposed from the first sealing portion 21E. The conductive plate 5 is placed abutting on (in contact with) the exposed surface 20*d*.

In the present embodiment, the outer edge portions of the first sealing portions 21D, 21E embedded in the second sealing portion 22 are continuous to each other. That is, the first sealing portions 21D, 21E are formed by folding one film in half with the edge portion 20*c* of the metal plate 20B interposed therebetween. The outer edge portions of the first sealing portions 21D, 21E are a folded portion (bent portion) of the film. The film forming the first sealing portions 21D, 21E is joined to the edge portion 20*c* on the one surface 20*a* of the metal plate 20B.

In the joining region, the surfaces of the metal plates 15, 20A, 20B are roughened. Although the roughened region may be provided only in the joining region, the entire one surface 15*a* of the metal plate 15 is roughened in the present embodiment. In addition, the entire one surface 20*a* and the other side 20*b* of the metal plate 20A are roughened. Furthermore, the entire one surface 20*a* of the metal plate 20B is roughened.

The surface roughening may be achieved by forming a plurality of protrusions, for example, by electrolyte plating. Forming the plurality of protrusions in the joining region allows melted resin to enter gaps between the plurality of protrusions formed by roughening on a joined interface between the metal plates and the first sealing portions 21 in the joining region, which offers an effect of anchoring. Thus, the joining strength between the metal plates 15, 20A, 20B and the first sealing portions 21 may be improved. The protrusions formed during the surface roughening each have a shape that becomes thicker from the proximal end toward the distal end, for example. As a result, the cross-sectional shape between protrusions disposed side by side becomes an undercut shape, which increases the effect of anchoring.

A plurality of internal spaces V are provided inside the power storage module 4. The internal spaces V each are provided between metal plates disposed side by side and defined by the metal plates disposed side by side and the sealing portion. The internal spaces V each are a space airtightly and liquid-tightly partitioned, between metal plates disposed side by side in the stacking direction D, by the metal plates and the sealing body 12. Such internal spaces V accommodate electrolyte solution (not illustrated) of, for example, an alkaline aqueous solution such as a potassium hydroxide aqueous solution. The separator 13, the positive electrode 16, and the negative electrode 17 are impregnated with the electrolyte solution. Since the electrolyte solution is strong alkaline, the sealing body 12 is made of a resin material having strong alkaline resistance.

Figure 3:
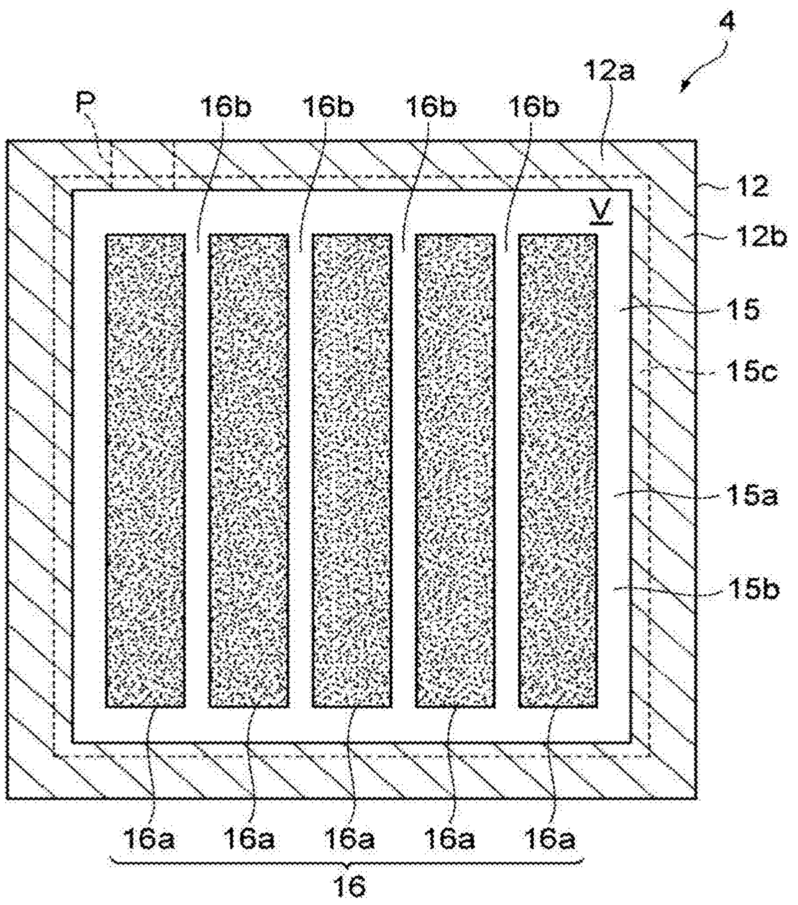
FIG. 3 is a cross-sectional view of the power storage module illustrated in FIG. 2, perpendicularly to a stacking direction.

FIG. 3 is a cross-sectional view of the power storage module 4 illustrated in FIG. 2, perpendicularly to the stacking direction. As illustrated in FIG. 3, liquid injection ports P are formed in one of the short-side portions 12*a* of the sealing body 12. The liquid injection ports P opened at the outer surface of the sealing body 12 extend through the sealing body 12 in a long-side direction of the sealing body 12. The liquid injection ports P provide communication between the internal spaces V and the outside of the power storage module 4. A position where each of the liquid injection ports P is provided in the one of the short-side portions 12*a* of the sealing body 12 is changed depending on the position of its associated internal space V in the stacking direction D (see FIG. 2). The liquid injection ports P are provided so as to be shifted in the short-side direction of the sealing body 12 so that liquid injection ports P disposed side by side in the stacking direction D (see FIG. 2) do not overlap. In the example of FIG. 3, the liquid injection port P is provided at one end of the one of the short-side portions 12*a* of the sealing body 12.

The positive electrode 16 includes a plurality of divided regions 16*a* divided by grooves 16*b* on the one surface 15*a*. The grooves 16*b* extend along the long-side direction of the one surface 15*a*. The one surface 15*a* forms bottom surfaces of the grooves 16*b*.

The plurality of divided regions 16*a* are spaced apart from each other in the short-side direction of the one surface 15*a*. In the present embodiment, the positive electrode 16 is divided into five divided regions 16*a* by four grooves 16*b*. The plurality of divided regions 16*a* each have a rectangular shape with the long-side direction of the one surface 15*a* being the long-side direction and the short-side direction of the one side surface 15*a* being the short-side direction. For example, the plurality of grooves 16*b* have the same shape.

Although the illustration is omitted, the negative electrode 17 also includes a plurality of divided regions divided by grooves, similarly to the positive electrode 16. The grooves of the negative electrode 17 are provided so as to overlap the grooves 16*b* of the positive electrode 16 as viewed in the stacking direction D (see FIG. 2). When the electrolyte solution is injected into the internal space V, gaps formed by the combination of the grooves of the positive electrode 16 and the grooves of the negative electrode 17 serve as passages for the electrolyte solution, similarly to gaps between the uncoated regions 15*d* on the one surfaces 15*a* and the uncoated regions 15*d* of the other surfaces 15*b*.

Figure 4:
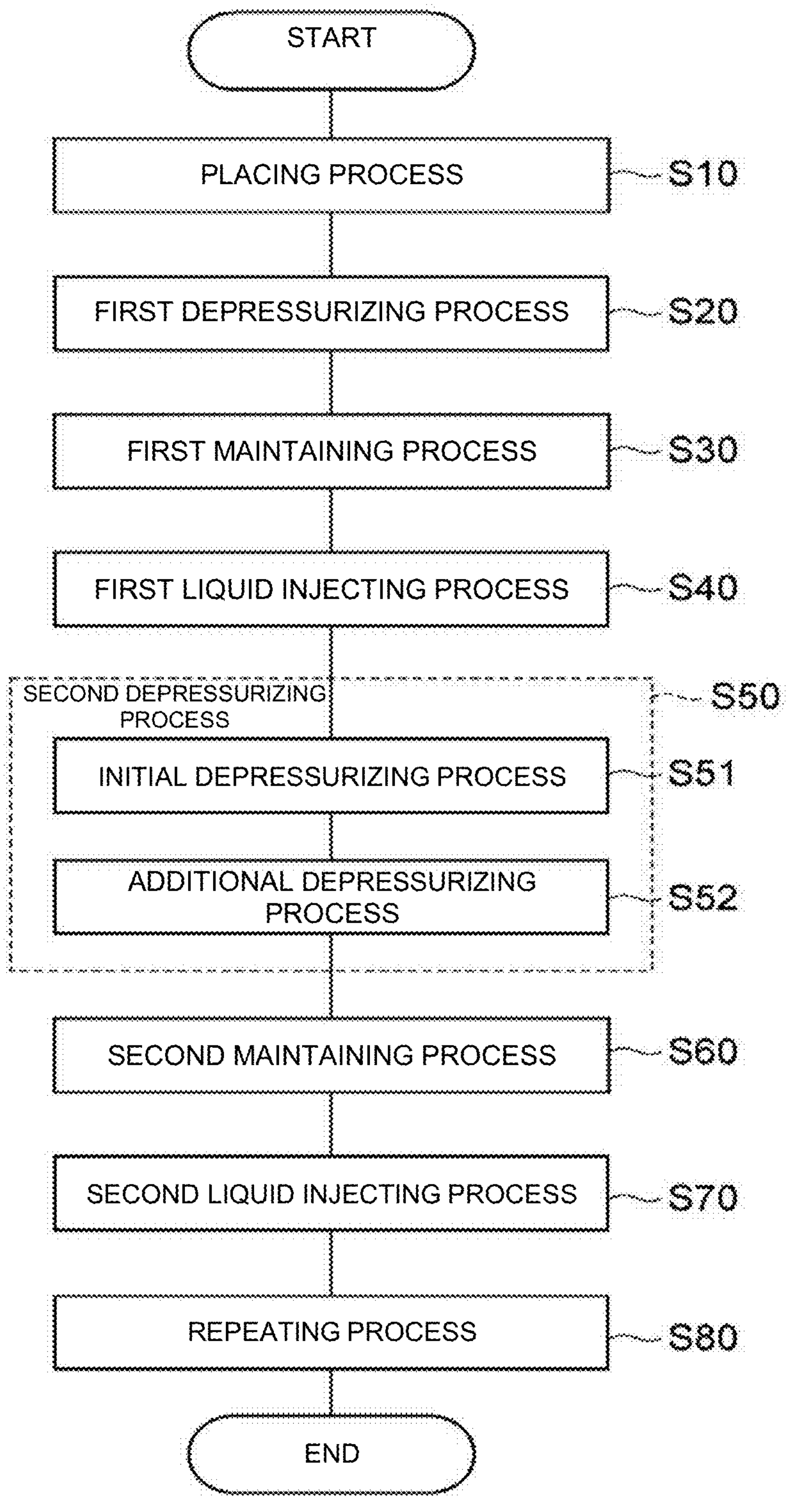
FIG. 4 is a flowchart showing a method for manufacturing a bipolar power storage device according to the embodiment.

FIG. 4 is a flowchart showing a method for manufacturing the bipolar power storage device 1 according to the embodiment. As shown in FIG. 4, the method for manufacturing the power storage device 1 includes a placing process S10, a first depressurizing process S20, a first maintaining process S30, a first liquid injecting process S40, a second depressurizing process S50, a second maintaining process S60, a second liquid injecting process S70, and a repeating process S80. Each of the processes will be explained below.

Figure 5:
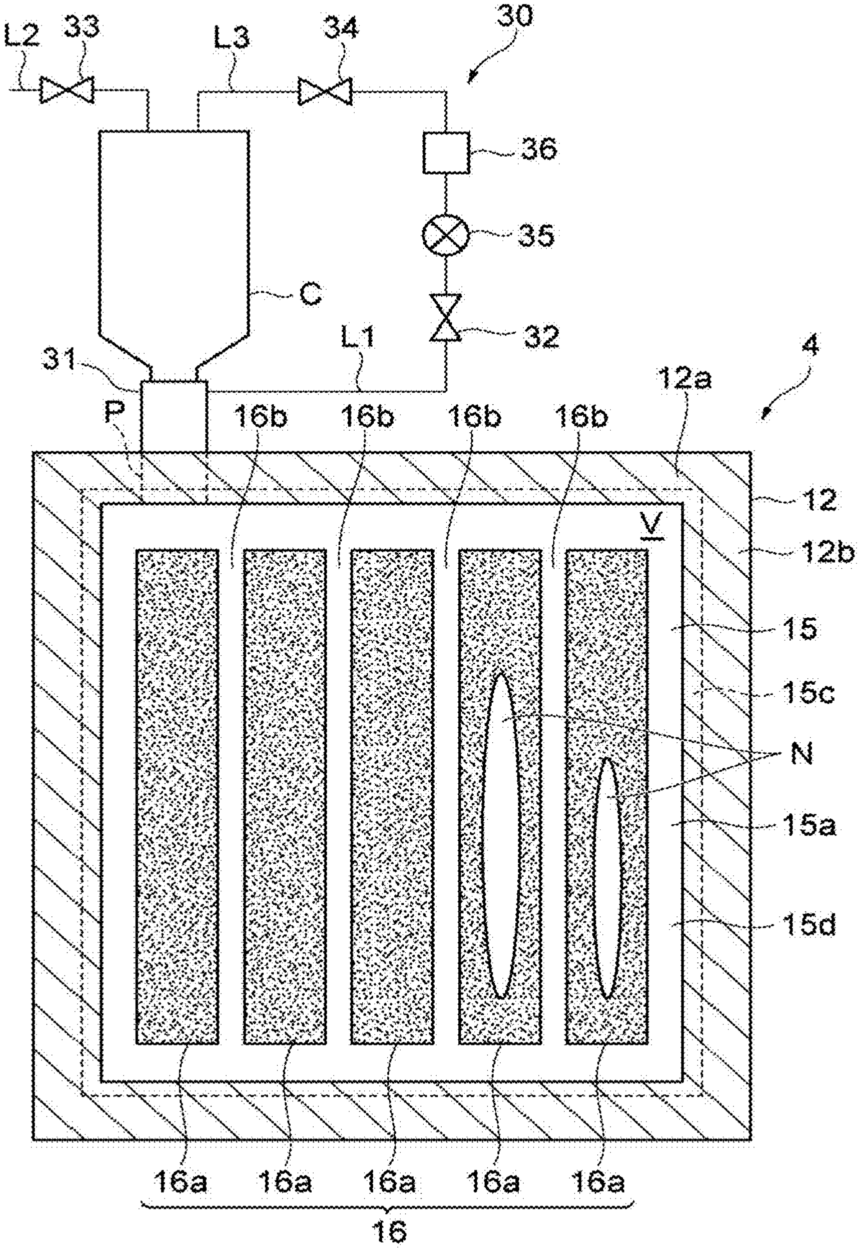
FIG. 5 is a view for describing a first liquid injecting process.

The placing process S10 is a process in which a supply device 30 is attached to the liquid injection port P, as illustrated in FIG. 5. The supply device 30 includes a syringe C, an attachment 31, pipes L1, L2, valves 32 to 34, a depressurizing pump (vacuum pump) 35, and an electro pneumatic regulator (precision regulator) 36. The syringe C is a holding member that is capable of holding the electrolyte solution. The syringe C is attached to the liquid injection port P via the attachment 31. The syringe C and the pipe L1 are connected to the attachment 31. The attachment 31 is configured to perform switching between a passage where the liquid injection port P and the syringe C are connected and a passage where the liquid injection port P and the pipe L1 are connected. For example, the attachment 31 is provided with a switching valve, and the passages to a connection destination of the liquid injection port P are switched by an operation of the switching valve. In addition, the attachment 31 is liquid-tightly and air-tightly attached to the liquid injection port P, and a connecting portion between the attachment 31 and the liquid injection port P is sealed in such an attached state.

The pipe L1 is a pipe for depressurizing the internal space V. The pipe L1 connects the attachment 31 and the depressurizing pump 35. The valve 32 is disposed in the pipe L1. The pipe L2 is a pipe for opening an inside of the syringe C to the atmosphere. The pipe L2 connects the inside of the syringe C and the outside of syringe C. The valve 33 is disposed in the pipe L2. The pipe L3 is a pipe for depressurizing the internal space V through the syringe C. The pipe L3 connects the syringe C and the depressurizing pump 35. The valve 34 and the electro pneumatic regulator 36 are disposed in the pipe L3. The electro pneumatic regulator 36 is disposed between the valve 34 and the depressurizing pump 35. In the placing process S10, the syringe C is attached to the liquid injection port P via the attachment 31.

The first depressurizing process S20 is a process in which the internal space V is depressurized to a first pressure that is lower than the atmospheric pressure through the liquid injection port P and the attachment 31. In the present embodiment, the first depressurizing process S20 depressurizes the internal space V through the liquid injection port P, the attachment 31, and the pipe L1, without using the syringe C. The first pressure is, for example, 0.01 kPa or more and 2 kPa or less. In the first depressurizing process S20, the connection destination of the liquid injection port P is switched to the pipe L1 by the attachment 31 to connect the liquid injection port P and the pipe L1, which allows communication therebetween. In addition, the depressurizing pump 35 is connected to the liquid injection port P by opening the valve 32. The depressurizing pump 35 causes gas in internal space V to be discharged to the outside of power storage module 4 through the liquid injection port P. In the first depressurizing process S20, the internal space V is depressurized from the atmospheric pressure (101.3 kPa) to the first pressure in, for example, 0.1 seconds or longer and 20 seconds or shorter. Thus, the depressurizing speed of the first depressurizing process S20 is, for example, 5 kPa/second or higher and 1000 kPa/second or lower.

The first maintaining process S30 is a process, after the first depressurizing process S20, in which the pressure in the internal space V is maintained at the first pressure. The first maintaining process S30 is performed immediately after the first depressurizing process S20. In the first maintaining process S30, time for which the pressure in the internal space V is maintained at the first pressure is 10 seconds or longer and 30 minutes or shorter, for example.

The first liquid injecting process S40 is a process in which the electrolyte solution is injected into the internal space V depressurized in the first depressurizing process S20. In the power storage module 4, since gas is generated due to charging/discharging reactions, and the like, an extra space needs to be provided in the internal space V to accommodate the generated gas. Therefore, a predetermined amount of the electrolyte solution is injected into the internal space V so that the extra space is formed in the internal space in a state in which impregnation of the electrodes with the electrolyte solution is completed.

FIG. 5 is a view for describing the first liquid injecting process S40. In the first liquid injecting process S40, the syringe C illustrated in FIG. 5 is used as the holding member that holds the predetermined amount of the electrolyte solution. The electrolyte solution may be supplied to the syringe C in the first liquid injecting process S40, or before the first liquid injecting process S40. In the first liquid injecting process S40, the connection destination of the liquid injection port P is switched to the syringe C by the attachment 31 to connect the liquid injection port P and the syringe C, which allows communication therebetween. Furthermore, opening the valve 33 allows the inside of the syringe C to be connected to the outside of the syringe C. As a result, the inside of the syringe C becomes the atmospheric pressure, and the differential pressure between the atmospheric pressure and the pressure in the internal space V depressurized to the first pressure lower than atmospheric pressure causes the electrolyte solution to be injected from the syringe C into the internal space V through the liquid injection port P. The positive electrode 16, the negative electrode 17, and the separator 13 are impregnated with the electrolyte solution in the internal space V.

The syringe C only needs to be connected to the liquid injection port P at least in the first liquid injecting process S40. Since the syringe C is attached to the liquid injection port P via the attachment 31 in the placing process S10, the internal space V may be depressurized to the first pressure through the liquid injection port P, the attachment 31, and the syringe C in the first depressurizing process S20 by connecting the syringe C before being supplied with electrolyte solution to the liquid injection port P.

The electrolyte solution injected into the internal space V from the liquid injection port P wets and spreads over the positive electrode 16, the negative electrode 17, and the separator 13 in order from the portions closest to the liquid injection port P. As described above, the gaps between the uncoated regions 15*d* on the one surfaces 15*a* and the uncoated regions 15*d* on the other surfaces 15*b*, and the gaps formed by the combination of the grooves of the positive electrodes 16 and the grooves of the negative electrodes 17, respectively, serve as the passages for the electrolyte solution. Therefore, the electrolyte solution easily reaches portions of the positive electrode 16, the negative electrode 17, and the separator 13 close to the passages, and does not easily reach portions of the positive electrode 16, the negative electrode 17, and the separator 13 far from the passages. In addition, the electrolyte solution easily reaches portions of the positive electrode 16, the negative electrode 17, and the separator 13 close to the liquid injection port P, and does not easily reach portions of the positive electrode 16, the negative electrode 17, and the separator 13 far from the liquid injection port P.

In the first liquid injecting process S40, liquid injection is performed by pressurizing the inside of the syringe C that holds the electrolyte solution with gas. The electrolyte solution is injected into the internal space V from the syringe C and gas is injected into the syringe C until the differential pressure between the pressure in the internal space V and the pressure inside the syringe C is eliminated. The gas used in the present embodiment is the atmospheric air (air). When all of the electrolyte solution held in the syringe C before the start of injection is injected into the internal space V, the pressure in the internal space V becomes equal to the atmospheric pressure. At this time, air also enters the internal space V, and the progress of impregnation with the electrolyte solution is stopped. Portions of the positive electrode 16, the negative electrode 17, and the separator 13 which the atmospheric air enters before the electrolyte solution become unimpregnated portions N that are not impregnated with the electrolyte solution. The gaps between the uncoated regions 15*d* on the one surfaces 15*a* and the uncoated regions 15*d* on the other surfaces 15*b* are wider than the gaps formed by the combination of the grooves of the positive electrodes 16 and the grooves of the negative electrodes 17, so that the electrolyte solution flows therethrough easily. Therefore, portions far from the liquid injection port P and also far from the uncoated regions 15*d* are difficult to get wet with the electrolyte solution, and are likely to become an unimpregnated portion N.

Figure 6:
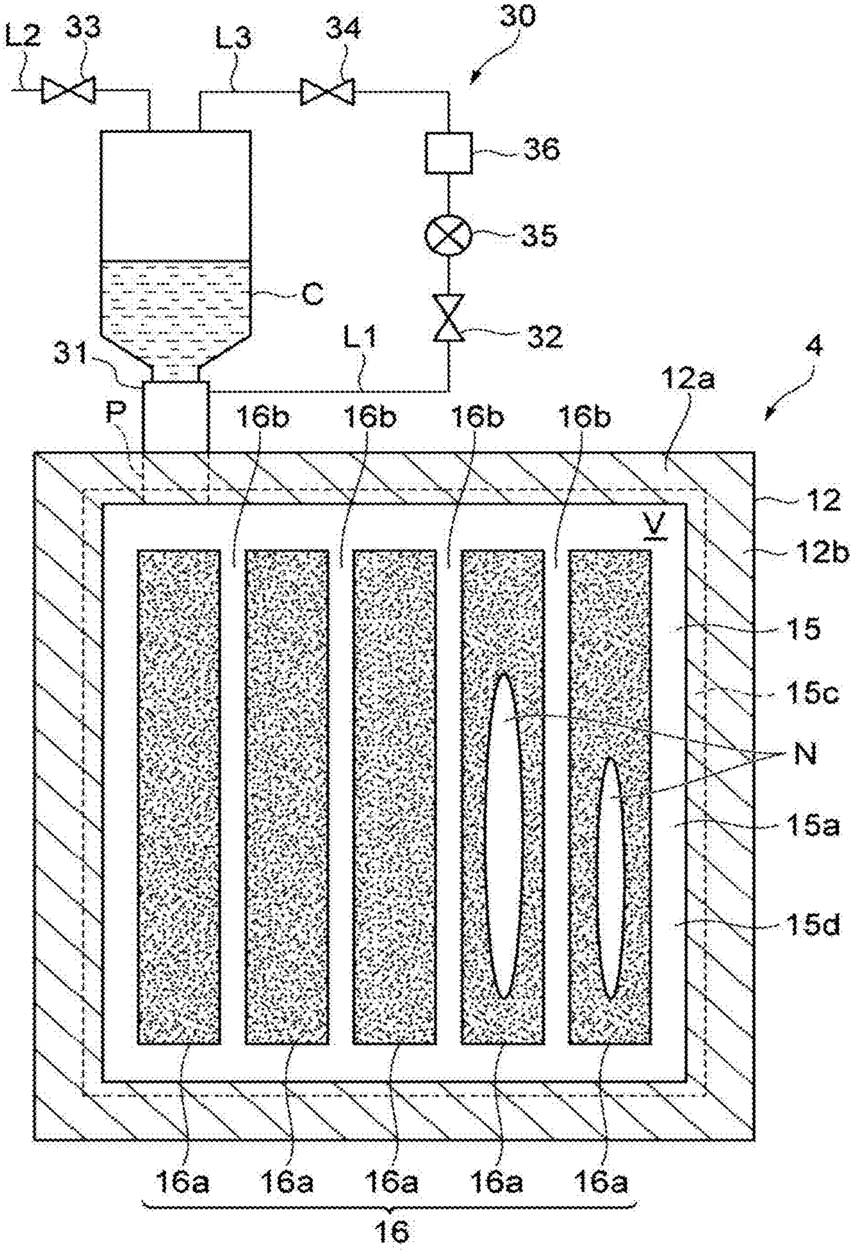
FIG. 6 is a view for describing a second depressurizing process.

FIG. 6 is a view for describing the second depressurizing process S50. The second depressurizing process S50 is a process in which the internal space V having the predetermined amount of electrolyte solution injected is depressurized to a second pressure lower than the atmospheric pressure through the liquid injection port P, the syringe C, the pipe L3, and the electro pneumatic regulator 36. In the second depressurizing process S50, the connection destination of the liquid injection port P is switched to the syringe C by the attachment 31 to connect the liquid injection port P and the syringe C, which allows communication therebetween. Further, by opening the valve 34, the depressurizing pump 35 is connected to the liquid injection port P via the electro pneumatic regulator 36. In the second depressurizing process S50, the depressurizing pump 35 is used. The depressurizing pump 35 is connected to the syringe C, and discharges the gas in the internal space V through the liquid injection port P while causing a part of the electrolyte solution to flow back into the syringe C from the internal space V.

The second pressure is higher than the first pressure. The second pressure is equal to or higher than the saturated vapor pressure of the electrolyte solution. This suppresses volatilization of the electrolyte solution. The saturated vapor pressure of the electrolyte solution varies depending on components that make up the electrolyte solution. The second pressure is 2 kPa or more and 20 kPa or less, for example. By setting the second pressure to 20 kPa or less, more preferably 10 kPa or less, the differential pressure between the pressure in the internal space V having been depressurized and the pressure inside the syringe C (e.g., the atmospheric pressure) may be increased in the subsequent second liquid injecting process S70. Therefore, impregnation of the positive electrode 16, the negative electrode 17, and the separator 13 with the electrolyte solution in the second liquid injecting process S70 is promoted.

The second depressurizing process S50 includes an initial depressurizing process S51 and an additional depressurizing process S52. The initial depressurizing process S51 is a process performed firstly in the second depressurizing process S50, and depressurizes the internal space V from the atmospheric pressure to a third pressure. The third pressure is lower than the atmospheric pressure and higher than the second pressure. The third pressure is 10 kPa or more and 50 kPa or less, for example. In the initial depressurizing process S51, the internal space Vis depressurized at a depressurizing speed lower than the depressurizing speed in the first depressurizing process S20. The depressurizing speed may be calculated from the pumping speed [m3/S]. In the initial depressurizing process S51, the internal space V is depressurized at a constant depressurizing speed. The depressurizing speed in the initial depressurizing process S51 is adjusted by the electro pneumatic regulator 36, for example. In the initial depressurizing process S51, the internal space V is depressurized from the atmospheric pressure to the third pressure in 5 seconds or longer and 100 seconds or shorter, for example. Thus, the depressurizing speed of the initial depressurizing process S51 is, for example, 0.2 kPa/second or higher and 18 kPa/second or lower.

The additional depressurizing process S52 is a process that is performed subsequently to the initial depressurizing process S51, and depressurizes the internal space V from the third pressure to the second pressure. In the additional depressurizing process S52, the internal space V may be depressurized at a higher depressurizing speed than that in the initial depressurizing process S51. In the additional depressurizing process S52, the internal space V may be depressurized at the same depressurizing speed as that in the first depressurizing process S20. The first depressurizing process S20 and the additional depressurizing process S52 are performed, for example, without using the electro pneumatic regulator 36. In the additional depressurizing process S52, the internal space V is depressurized from the third pressure to the second pressure in 0.1 seconds or longer and 20 seconds or shorter, for example. Thus, the depressurizing speed of the additional depressurizing process S52 is 2 kPa/second or higher and 500 kPa/second or lower, for example.

The second maintaining process S60 is a process, after the second depressurizing process S50, in which the pressure in the internal space V is maintained at the second pressure. The second maintaining process S60 is performed immediately after the second depressurizing process S50. In the second maintaining process S60, time for which the pressure in the internal space V is maintained at the second pressure is, for example, 10 minutes or shorter. By providing such a pressure maintaining time, the electrolyte solution remaining in the internal space V without being impregnated into the positive electrode 16, the negative electrode 17, and the separator 13 may be reliably sucked back (flow back) into the syringe C.

Figure 7:
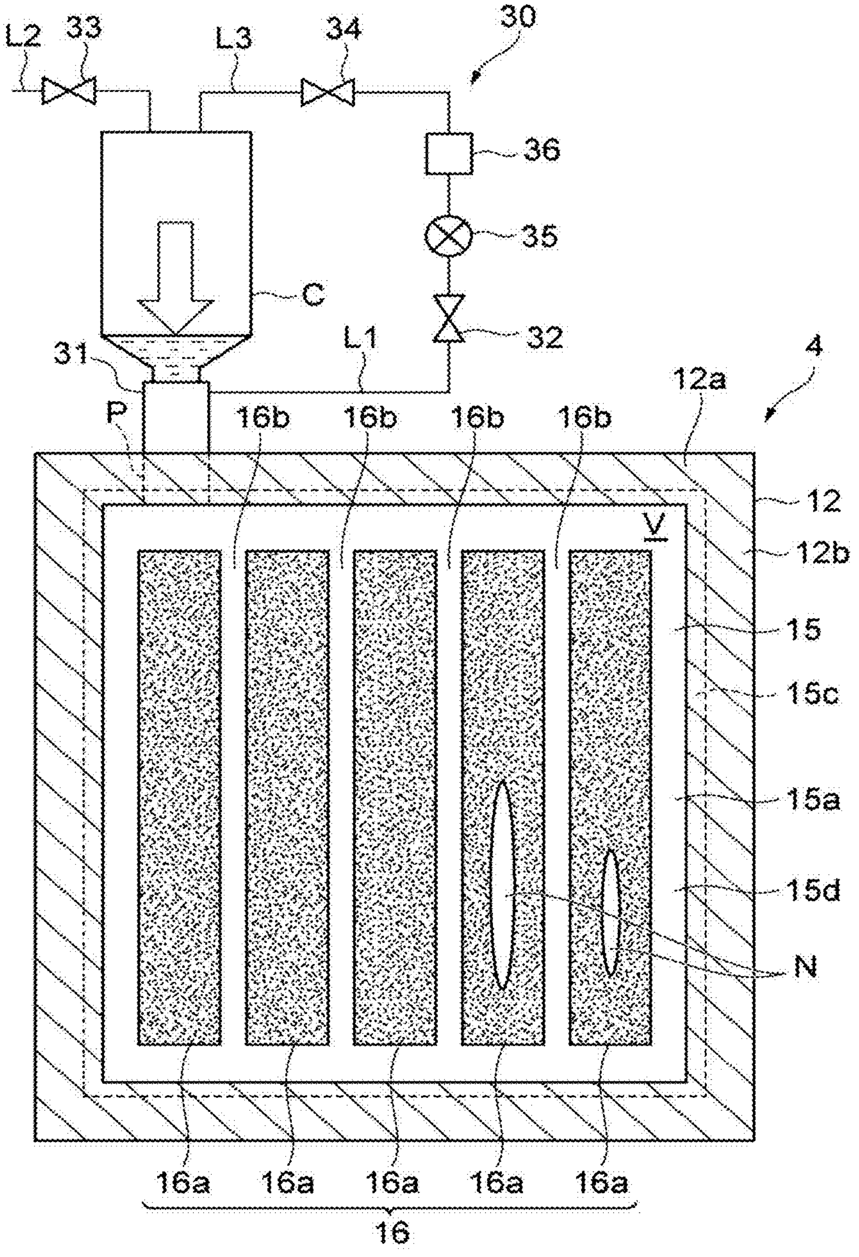
FIG. 7 is a view for describing a second liquid injecting process.
Figure 8:
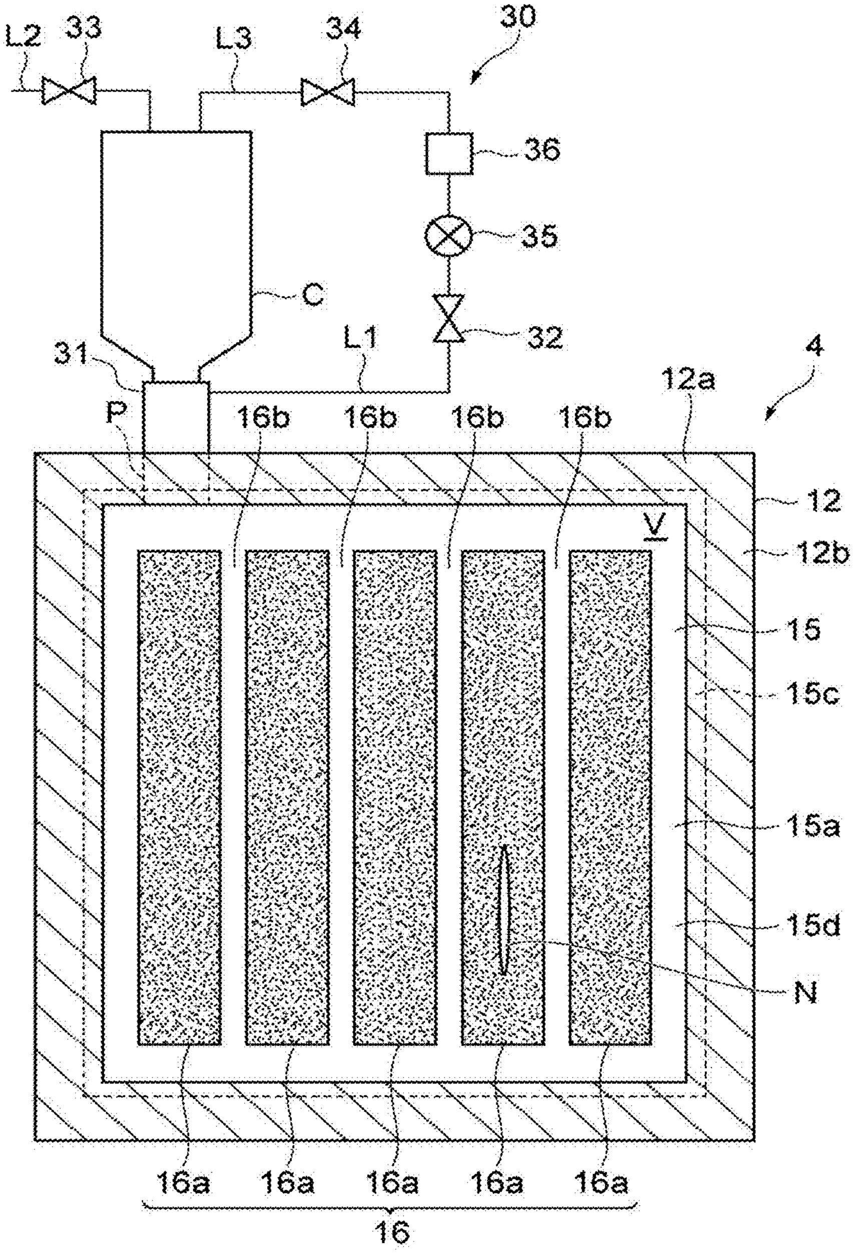
FIG. 8 is a view for describing the second liquid injecting process.

FIGS. 7 and 8 are views for describing the second liquid injecting process S70. FIG. 7 illustrates a state during the second liquid injecting process S70, and FIG. 8 illustrates a state after the second liquid injecting process S70. The second liquid injecting process S70 is a process in which a part of the electrolyte solution having flowed back into the syringe C from the internal space V in the second depressurizing process S50 is re-injected into the internal space V through the liquid injection port P. In the second liquid injecting process S70, the connection destination of the liquid injection port Pis switched to the syringe C by the attachment 31 to connect the liquid injection port P and the syringe C, which allows communication therebetween. Furthermore, by opening the valve 33, the inside of the syringe C is connected to the outside of the syringe C.

In the second liquid injecting process S70, by increasing the pressure of the inside of the syringe C to the second pressure or higher, re-injection is performed using the pressure difference between the pressure in the internal space V and the pressure inside the syringe C. In the second liquid injecting process S70, for example, by opening the inside of the syringe C depressurized to the second pressure in the previous process to the atmosphere to allow the atmospheric air (air) to flow into the syringe C, the pressure in the syringe C becomes the atmospheric pressure. When the pressure in the syringe C becomes the atmospheric pressure, a difference in pressure is generated between the inside of the syringe C and the internal space V depressurized to the second pressure. Using this differential pressure, the electrolyte solution having flowed back into the syringe C in the second depressurizing process S50 is re-injected into the internal space V through the liquid injection port P. By re-injecting the electrolyte solution, the unimpregnated portion N is reduced.

The repeating process S80 is a process in which the second depressurizing process S50 and the second liquid injecting process S70 are performed repeatedly. In the present embodiment, in the repeating process S80, the second depressurizing process S50, the second maintaining process S60, and the second liquid injecting process S70 are repeated. The number of times of repeating the processes is, for example, two. According to the repeating process S80, the unimpregnated portion N is further reduced. In the second maintaining process S60, the time for which the internal space V is maintained at the second pressure becomes longer depending on the number of times of performing the second depressurizing process S50. For example, when the number of times of repeating the processes is three, the maintaining time in the second maintaining process S60 is longer after the second depressurizing process S50 for the second time than after the second depressurizing process S50 for the first time, and is further longer after the second depressurizing process S50 for the third time.

In the second liquid injecting process S70 that is performed last, oxygen gas may be injected from the syringe C into the internal space V by supplying oxygen gas into the syringe C. By purging the inside of the syringe C with oxygen to a pressure higher than the second pressure (for example, atmospheric pressure), oxygen gas is injected into the internal space V together with a part of the electrolyte solution held in the syringe C. For example, when the battery is a nickel-metal hydride secondary battery as in the present embodiment, the oxygen gas injected into the internal space V reacts with hydrogen incorporated in the hydrogen storage alloy that is the active material of the negative electrode 17, which increases the extra space in the internal space V. In supplying oxygen into the syringe C, the inside of the syringe C may be pressurized with oxygen to make the pressure higher than the atmospheric pressure. By creating this state, re-injection of liquid can be accelerated, and the time required for re-injection of liquid may be shortened.

In the method for manufacturing the power storage device 1, the processes S10 to S80 are performed for each of the internal spaces V. At this time, at least one of the first depressurizing process S20 and the second depressurizing process S50 is performed for one of a pair of internal spaces V disposed side by side in the stacking direction D (see FIG. 2) in a state in which the other of the pair of the internal spaces V disposed side by side is not depressurized. The state of being not depressurized is, for example, a state of being at the atmospheric pressure.

Since the metal plate 15 is thin and easily deformed, the metal plate 15 deforms so as to be recessed toward the internal space V where the pressure is lower if there is a difference in pressure between the internal spaces V disposed side by side in the stacking direction D. Therefore, a pressing force due to the deformation of the metal plate 15 is applied from the stacking direction D to the internal space V where the pressure is low. That is, when depressurizing one of the internal spaces V disposed side by side, the one of the internal spaces V may be more easily depressurized in a state in which the other of the internal spaces V is not depressurized.

In the present embodiment, both the first depressurizing process S20 and the second depressurizing process S50 are performed for one of a pair of the internal spaces V disposed side by side in a state where the other of the pair of the internal spaces Vis not depressurized. This allows the pressure to be easily reduced in both processes. Further, when the internal spaces V are arranged on opposite sides of the internal space V to be depressurized in the stacking direction D, the internal space V to be depressurized is depressurized while the internal spaces V on the opposite sides are not depressurized. As a result, a pressing force is applied to the internal space V to be depressurized from the opposite sides in the stacking direction, so that depressurization may be performed more easily.

For example, the processes S20 to S80 may be performed on the internal spaces V arranged on the odd-numbered positions in order of arranged positions in the stacking direction, and then performed on the internal spaces V arranged on the even-numbered positions. Alternatively, for example, the processes are divided into the processes S20 to S40 and the processes S50 to S80, and the divided processes are performed to the internal spaces V arranged on the odd-numbered positions and the internal spaces V arranged on the even-numbered positions in order.

As described above, the method for manufacturing the power storage device 1 includes the first depressurizing process S20 in which the internal space V is depressurized to the first pressure through the liquid injection port P, and the first liquid injecting process S40 in which the predetermined amount of the electrolyte solution is injected to the internal space V depressurized in the first depressurizing process S20 through the liquid injection port P from the syringe C holding the predetermined amount of the electrolyte solution. In this way, after the internal space V is depressurized to the first pressure in the first depressurizing process S20, the electrolyte solution is injected in the first liquid injecting process S40, so that the electrolyte solution may be easily injected into the internal space V due to the differential pressure.

The manufacturing method of the power storage device 1 includes the second depressurizing process S50 in which the internal space V into which a predetermined amount of electrolyte solution is injected is depressurized to the second pressure through the liquid injection port P to cause a part of the electrolyte solution to flow back into the syringe C, and the second liquid injecting process S70 in which the electrolyte solution having flowed back from the internal space V into the syringe C in the second depressurizing process S50 is re-injected into the space through the injection port P. In this way, after the internal space V into which the predetermined amount of the electrolyte solution is injected is depressurized to cause the part of the electrolyte solution to flow back to the syringe C by the second depressurizing process S50, the electrolyte solution is re-injected to the internal space V by the second liquid injecting process S70, so that the positive electrode 16, the negative electrode 17, and the separator 13 are sufficiently impregnated with the electrolyte solution.

The second depressurizing process S50 includes the initial depressurizing process S51 in which the internal space V is depressurized at the depressurizing speed lower than that in the first depressurizing process S20. If depressurizing is performed without controlling the depressurizing speed in a state where the electrolyte solution is injected into the internal space V, defective impregnation of the positive electrode 16, the negative electrode 17, and the separator 13 with the electrolyte solution may occur. Furthermore, the electrolyte solution flowing back into the syringe C may be scattered. The electrolyte solution that adheres to the inner wall of the syringe C due to the electrolyte solution scattering may not be re-injected into the internal space V. As a result, the amount of the electrolyte solution in the internal space V may fall below the predetermined amount. The amount of the electrolyte solution is set to the minimum amount that allows the positive electrode 16, the negative electrode 17, and the separator 13 to be impregnated with the electrolyte solution to form the extra space in the internal space V. If the amount of the electrolyte solution is less than the predetermined amount, the unimpregnated portions N may be formed in the positive electrode 16, negative electrode 17, and separator 13, and battery performance may deteriorate. In the present embodiment, the second depressurizing process S50 is performed by controlling the depressurizing speed, so that impregnation of the electrolyte solution into the positive electrode 16, the negative electrode 17, and the separator 13 is promoted, which suppresses the defective impregnation of the positive electrode 16, the negative electrode 17, and the separator 13. Further, scattering of the electrolyte solution flowing back into the syringe C may be suppressed, and a decrease in battery performance may be suppressed.

In the initial depressurizing process S51, the internal space V is depressurized at a constant depressurizing speed. This suppresses scattering of the electrolyte solution more reliably.

The second pressure is higher than the first pressure and is equal to or higher than the saturated vapor pressure of the electrolyte solution. Therefore, volatilization of the electrolyte solution may be suppressed in the second depressurizing process S50. In the first depressurizing process S20, since the electrolyte solution is not injected into the internal space V, the first pressure may be set within the depressurizing capacity of the depressurizing pump 35, regardless of the saturated vapor pressure of the electrolyte solution. The lower the first pressure is, the greater the differential pressure with the atmospheric pressure becomes, so that the positive electrode 16, the negative electrode 17, and the separator 13 are easily impregnated with the electrolyte solution in the first liquid injecting process S40.

In the second liquid injecting process S70, oxygen gas may be injected from the syringe C into the internal space V by supplying oxygen gas into the syringe C. Therefore, by taking oxygen gas into the negative electrode 17, the extra space in the internal space V may be expanded.

The method for manufacturing the power storage device 1 further includes the repeating process S80 in which the second depressurizing process S50 and the second liquid injecting process S70 are performed repeatedly. Therefore, the positive electrode 16, the negative electrode 17, and the separator 13 may be more sufficiently impregnated with the electrolyte solution.

In the second liquid injecting process S70 which is performed last, oxygen gas is injected from the syringe C into the internal space V by supplying oxygen gas into the syringe C. Thus, oxygen gas is taken into the negative electrode 17. As a result, the extra space within the internal space V may be expanded.

The method for manufacturing the power storage device 1 further includes the second maintaining process S60 in which the internal space Vis maintained at the second pressure after the second depressurizing process S40. As a result, since the space is maintained in a depressurized state by the second maintaining process S60, gas is easily discharged from the unimpregnated portions N of the positive electrode 16, the negative electrode 17, and the separator 13. In addition, the time for which the internal space V is maintained at the second pressure in the second maintaining process S60 becomes longer depending on the number of times of performing the second depressurizing process S50. Although the unimpregnated portion N decreases as the number of times of performing the second depressurizing process S50 increases, the time for which the internal space V is maintained in a depressurized state in the second maintaining process S60 increases depending on the number of times of performing the second depressurizing process S50, so that gas is more easily discharged from the unimpregnated portion N.

At least one of the first depressurizing process S20 and the second depressurizing process S50 is performed to one of a pair of the internal spaces V disposed side by side in the stacking direction D in a state in which the other of the pair of the internal spaces V is not depressurized. Therefore, the pressing force is applied to the one of the internal spaces V from the other of the internal spaces V due to the difference in pressure, so that depressurizing may be performed easily.

The second depressurizing process S50 includes the additional depressurizing process S52 in which the internal space V is depressurized at the depressurizing speed higher than that in the initial depressurizing process S51. Therefore, as compared to the case where depressurizing is continued at the same depressurizing speed as in the initial depressurizing process S51, manufacturing time may be shortened, and the productivity can be improved.

The present disclosure is not limited to the above embodiment.

The method for manufacturing the power storage device 1 need not include the repeating process S80. The first pressure may be equivalent to the second pressure depending on the depressurizing capacity of the depressurizing pump 35. The method for manufacturing the power storage device 1 need not include the second maintaining process S60.

In the first liquid injecting process S40, the electrolyte solution may be injected into the internal space V by increasing the pressure in the syringe C to a pressure higher than the atmospheric pressure. In this case, due to the differential pressure between the pressure in the syringe C and the pressure in the internal space V, the electrolyte solution is injected from the syringe C into the internal space V through the liquid injection port P. When the inside of the syringe C is pressurized to a pressure higher than the atmospheric pressure in this way, liquid injection is accelerated, and the liquid injection time may be shortened. Similarly to the first liquid injecting process S40, also in the second liquid injecting process S70, the electrolyte solution may be re-injected into the internal space V by increasing the pressure in the syringe C to a pressure higher than the atmospheric pressure. In this case, the re-injection is accelerated and the time for re-injection may be shortened.

REFERENCE SIGNS LIST

1 bipolar power storage device
11 electrode stack
12 sealing body
14 bipolar electrode
15 metal plate (current collector)
15*a* one surface
15*b* other surface
16 positive electrode
17 negative electrode
31 attachment
C syringe (holding member)
D stacking direction
P liquid injection port
V internal space

The invention claimed is:

1. A method for manufacturing a bipolar power storage device, the bipolar power storage device including;

an electrode stack in which electrodes are stacked, the electrodes including a bipolar electrode that includes a current collector, a positive electrode active material layer on one surface of the current collector, and a negative electrode active material layer on the other surface of the current collector;

a sealing body provided between the electrodes disposed side by side, the sealing body and the electrodes disposed side by side defining an internal space in which an electrolyte solution is accommodated; and a liquid injection port formed in the sealing body and providing communication between the internal space and an outside of the bipolar power storage device, the method comprising:

a first depressurizing process in which the internal space is depressurized to a first pressure lower than an atmospheric pressure, through an attachment attached to the liquid injection port;

a first liquid injecting process, after the first depressurizing process, in which a predetermined amount of the electrolyte solution is injected into the internal space depressurized in the first depressurizing process from a holding member through the liquid injection port by increasing the pressure in the holding member holding the predetermined amount of the electrolyte solution to a pressure higher than the first pressure;

a second depressurizing process, after the first liquid injecting process, in which a part of the electrolyte solution flows back from the internal space to the holding member through the holding member and the liquid injection port by depressurizing the internal space in which the predetermined amount of the electrolyte solution is injected to a second pressure lower than the atmospheric pressure; and a second liquid injecting process, after the second depressurizing process, in which the electrolyte solution is injected into the internal space through the liquid injection port from the holding member by increasing the pressure in the holding member holding the electrolyte solution having flowed back in the second depressurizing process to a pressure higher than the second pressure, wherein the second depressurizing process includes an initial depressurizing process in which the internal space is depressurized at a depressurizing speed lower than a depressurizing speed in the first depressurizing process.

2. The method for manufacturing the bipolar power storage device according to claim 1, wherein the internal space is depressurized at a constant depressurizing speed in the initial depressurizing process.

3. The method for manufacturing the bipolar power storage device according to claim 1, wherein the second pressure is higher than the first pressure.

4. The method for manufacturing the bipolar power storage device according to claim 1, wherein the second pressure is equal to or higher than a saturated vapor pressure of the electrolyte solution.

5. The method for manufacturing the bipolar power storage device according to claim 1, wherein oxygen gas is supplied into the holding member in the second liquid injecting process to inject the oxygen gas into the internal space from the holding member.

6. The method for manufacturing the bipolar power storage device according to claim 1, further comprising a repeating process in which the second depressurizing process and the second liquid injecting process are repeatedly performed.

7. The method for manufacturing the bipolar power storage device according to claim 6, wherein oxygen gas is supplied into the holding member in the second liquid injecting process performed last to inject the oxygen gas into the internal space from the holding member.

8. The method for manufacturing the bipolar power storage device according to claim 6, further comprising a maintaining process in which the internal space is maintained at the second pressure after the second depressurizing process, wherein a time for which the internal space is maintained at the second pressure in the maintaining process becomes longer depending on the number of times of performing the second depressurizing process.

9. The method for manufacturing the bipolar power storage device according to claim 1, further comprising a maintaining process in which the internal space is maintained at the second pressure after the second depressurizing process.

10. The method for manufacturing the bipolar power storage device according to claim 1, wherein at least one of the first depressurizing process and the second depressurizing process is performed to one of a pair of the internal spaces disposed side by side in a stacking direction in a state in which the other of the pair of the internal spaces is not depressurized.

11. The method for manufacturing the bipolar power storage device according to claim 1, wherein the second depressurizing process includes an additional depressurizing process, after the initial depressurizing process, in which the internal space is depressurized at a depressurizing speed higher than a depressurizing speed in the initial depressurizing process.

12. The method for manufacturing the bipolar power storage device according to claim 1, further comprising a placing process in which the holding member capable of holding the electrolyte solution is attached to the liquid injection port via the attachment.

13. The method for manufacturing the bipolar power storage device according to claim 1, wherein the electrolyte solution is injected into the internal space by increasing the pressure in the holding member to a pressure higher than the atmospheric pressure in the first liquid injecting process.

14. The method for manufacturing the bipolar power storage device according to claim 1, wherein the electrolyte solution is injected into the internal space by increasing the pressure in the holding member to a pressure higher than the atmospheric pressure in the second liquid injecting process.

* * * * *